(12) United States Patent
Mercier et al.

(10) Patent No.: US 10,967,721 B2
(45) Date of Patent: Apr. 6, 2021

(54) VEHICLE HAVING SEPARABLE DRIVER AND PROPULSION MODULES

(71) Applicant: BOMBARDIER RECREATIONAL PRODUCTS INC., Valcourt (CA)

(72) Inventors: Daniel Mercier, Magog (CA); Alain Massicotte, Sherbrooke (CA); Guillaume Auger, Danville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 121 days.

(21) Appl. No.: 16/089,947

(22) PCT Filed: Mar. 31, 2017

(86) PCT No.: PCT/IB2017/051878
§ 371 (c)(1),
(2) Date: Sep. 28, 2018

(87) PCT Pub. No.: WO2017/168399
PCT Pub. Date: Oct. 5, 2017

(65) Prior Publication Data
US 2020/0079459 A1   Mar. 12, 2020

Related U.S. Application Data

(60) Provisional application No. 62/316,217, filed on Mar. 31, 2016.

(51) Int. Cl.
*B60K 1/04* (2019.01)
*B60K 15/04* (2006.01)
(Continued)

(52) U.S. Cl.
CPC .............. *B60K 1/04* (2013.01); *B60K 7/0007* (2013.01); *B60K 15/0406* (2013.01);
(Continued)

(58) Field of Classification Search
CPC .......... B60L 53/16; B60L 53/18; B60L 50/66; B60L 15/20; B60K 1/04; B60K 7/0007;
(Continued)

(56) References Cited

U.S. PATENT DOCUMENTS 3,934,669 A    1/1976  Adams
4,881,756 A    11/1989 Kumasaka et al.
(Continued)

FOREIGN PATENT DOCUMENTS

CN    1201424 A    12/1998
CN    1829626 A1    9/2006
(Continued)

OTHER PUBLICATIONS

R. Riley, WO 2009/114154 Machine English translation, ip.com (Year: 2011).*

(Continued)

*Primary Examiner* — Karen Beck
(74) *Attorney, Agent, or Firm* — BCF, LLP

(57) ABSTRACT

A vehicle has a driver module and a propulsion module selectively connected to the driver module. The modules are separable from each other as independent units. The driver module has a driver module frame, at least one front wheel operatively connected to the driver module frame, at least one front suspension assembly operatively connecting the at least one front wheel to the driver module frame, and a seat connected to the frame. The propulsion module has a propulsion module frame, at least one rear wheel operatively connected to the propulsion module frame, at least one rear suspension assembly operatively connecting the at least one rear wheel to the propulsion module frame, a motor operatively connected to the at least one rear wheel, and an energy storage device operatively connected to the motor.

22 Claims, 10 Drawing Sheets

(51) Int. Cl.
| | |
|---|---|
| *B60L 50/60* | (2019.01) |
| *B60L 53/16* | (2019.01) |
| *B60L 53/18* | (2019.01) |
| *B60K 7/00* | (2006.01) |
| *B60K 17/04* | (2006.01) |
| *B60L 15/20* | (2006.01) |
| *B62J 1/08* | (2006.01) |
| *B62K 5/05* | (2013.01) |
| *B62K 5/06* | (2006.01) |
| *B62K 5/08* | (2006.01) |
| *B62K 11/04* | (2006.01) |
| *B62K 15/00* | (2006.01) |
| *B62K 21/18* | (2006.01) |
| *B62K 23/06* | (2006.01) |
| *F02M 35/10* | (2006.01) |
| *G07C 5/08* | (2006.01) |
| *B62K 19/06* | (2006.01) |
| *B62K 5/00* | (2013.01) |
| *F02M 35/024* | (2006.01) |
| *F02M 35/16* | (2006.01) |
| *B62K 19/08* | (2006.01) |

(52) U.S. Cl.
CPC ............ *B60K 17/043* (2013.01); *B60L 15/20* (2013.01); *B60L 50/66* (2019.02); *B60L 53/16* (2019.02); *B60L 53/18* (2019.02); *B62J 1/08* (2013.01); *B62K 5/05* (2013.01); *B62K 5/06* (2013.01); *B62K 5/08* (2013.01); *B62K 11/04* (2013.01); *B62K 15/00* (2013.01); *B62K 21/18* (2013.01); *B62K 23/06* (2013.01); *F02M 35/10013* (2013.01); *G07C 5/085* (2013.01); *B60K 2001/0422* (2013.01); *B60K 2007/0061* (2013.01); *B60L 2200/12* (2013.01); *B62K 19/06* (2013.01); *B62K 19/08* (2013.01); *B62K 2005/001* (2013.01); *B62K 2015/001* (2013.01); *B62K 2204/00* (2013.01); *F02M 35/024* (2013.01); *F02M 35/162* (2013.01); *G07C 2205/02* (2013.01)

(58) Field of Classification Search
CPC .............. B60K 15/0406; B60K 17/043; B60K 2001/0422; B62J 1/08; B62K 5/05; B62K 5/06; B62K 5/08; B62K 11/04; B62K 15/00; B62K 21/18; B62K 23/06; B62K 19/08; F02M 35/10013; G07C 5/085
See application file for complete search history.

(56) References Cited

U.S. PATENT DOCUMENTS

| | | | |
|---|---|---|---|
| 5,042,607 A | | 8/1991 | Falkenson et al. |
| 5,207,288 A | * | 5/1993 | Ono ................. B60L 50/52 |
| | | | 180/220 |
| 5,343,974 A | | 9/1994 | Rabek |
| 5,421,427 A | | 6/1995 | Ogawa et al. |
| 5,518,081 A | | 5/1996 | Thibodeau |
| 5,613,569 A | | 3/1997 | Sugioka et al. |
| 6,679,345 B2 | | 1/2004 | Hirayama et al. |
| 6,691,813 B2 | | 2/2004 | Schless |
| 6,717,281 B1 | * | 4/2004 | Brandon ............... B60W 10/30 |
| | | | 290/40 C |
| 7,117,966 B2 | | 10/2006 | Kohda et al. |
| 7,210,546 B2 | | 5/2007 | Kunag et al. |
| 7,210,548 B2 | | 5/2007 | Yonehana et al. |
| 7,267,190 B2 | | 9/2007 | Hirano |
| 7,900,728 B2 | | 3/2011 | Suzuki et al. |
| 8,316,976 B2 | | 11/2012 | Johnson et al. |
| 8,317,227 B2 | | 11/2012 | Klimek et al. |
| 8,336,607 B2 | | 12/2012 | Abadia et al. |
| 8,347,995 B2 | | 1/2013 | Fernandez-Mateo |
| 8,376,075 B2 | | 2/2013 | Sasage et al. |
| 8,393,426 B2 | | 3/2013 | Takahashi et al. |
| 8,393,427 B2 | | 3/2013 | Rawlinson |
| 8,789,640 B2 | | 7/2014 | Matsuda |
| 8,893,833 B2 | | 11/2014 | Tsukamoto et al. |
| 8,936,129 B2 | * | 1/2015 | Honda ................... B62K 11/10 |
| | | | 180/291 |
| 9,156,342 B2 | | 10/2015 | Annaberger et al. |
| 9,211,803 B2 | * | 12/2015 | Yonehana ............... B60L 58/10 |
| 9,499,042 B2 | * | 11/2016 | Barth ..................... B60K 6/547 |
| 10,414,277 B1 | * | 9/2019 | Herron ...................... H02J 7/00 |
| 2008/0169627 A1 | | 7/2008 | Bagnariol ................. B62K 11/04 |
| | | | 280/304.3 |
| 2009/0145674 A1 | * | 6/2009 | Lee ........................ B60K 6/485 |
| | | | 180/65.1 |
| 2010/0163326 A1 | * | 7/2010 | Takamura ................ B60K 1/04 |
| | | | 180/68.5 |
| 2010/0230192 A1 | * | 9/2010 | Riley ................... B60K 17/356 |
| | | | 180/65.25 |
| 2010/0241298 A1 | * | 9/2010 | Sinke .................... B60W 10/08 |
| | | | 701/22 |
| 2011/0094807 A1 | * | 4/2011 | Pruitt ..................... B60K 17/36 |
| | | | 180/65.6 |
| 2011/0175569 A1 | * | 7/2011 | Austin .................. B60L 53/305 |
| | | | 320/109 |
| 2012/0248851 A1 | * | 10/2012 | Nakashima .......... B60K 7/0007 |
| | | | 301/6.5 |
| 2012/0255279 A1 | * | 10/2012 | Atluri .................... B60K 16/00 |
| | | | 60/274 |
| 2013/0118000 A1 | | 5/2013 | Florus et al. |
| 2013/0206491 A1 | * | 8/2013 | Kor ...................... B60K 7/0007 |
| | | | 180/65.225 |
| 2013/0240274 A1 | * | 9/2013 | Vitale .................... B62D 21/14 |
| | | | 180/65.1 |
| 2013/0256049 A1 | | 10/2013 | Matsuda |
| 2014/0197790 A1 | * | 7/2014 | Kaneyasu ............... B60L 50/51 |
| | | | 320/109 |
| 2014/0238758 A1 | * | 8/2014 | Barth ....................... B60K 6/48 |
| | | | 180/65.25 |
| 2014/0305720 A1 | | 10/2014 | Chan |
| 2015/0083508 A1 | * | 3/2015 | Bluethmann ....... B60W 10/192 |
| | | | 180/204 |
| 2015/0083509 A1 | * | 3/2015 | Borroni-Bird ........ B60W 10/08 |
| | | | 180/204 |
| 2015/0137481 A1 | * | 5/2015 | Manternach ........... B62K 5/007 |
| | | | 280/400 |
| 2015/0232150 A1 | * | 8/2015 | Kosuge ................... B60L 58/14 |
| | | | 180/220 |
| 2017/0246942 A1 | * | 8/2017 | Takaki ..................... B60K 1/00 |
| 2017/0320388 A1 | * | 11/2017 | Monfette ................. B60R 21/13 |
| 2018/0345971 A1 | * | 12/2018 | Birnschein ............ B60W 10/30 |
| 2018/0354375 A1 | * | 12/2018 | Dao ........................ H02J 7/007 |
| 2020/0130771 A1 | * | 4/2020 | Jacobsz Rosier ........ B62J 45/40 |
| 2020/0164943 A1 | * | 5/2020 | Laberge ................... B62K 5/08 |

FOREIGN PATENT DOCUMENTS

| | | | |
|---|---|---|---|
| EP | 2470390 B1 | 7/2012 | |
| EP | 2505422 A2 | 10/2012 | |
| JP | 2000118469 | 4/2000 | |
| JP | 2000177669 | 6/2000 | |
| JP | 2005239032 | 9/2005 | |
| JP | 2011111115 | 6/2011 | |
| WO | WO-2009114154 A1 * | 9/2009 | .............. B60K 6/52 |
| WO | WO2009114154 A1 | 9/2009 | |
| WO | WO-2011023681 A1 * | 3/2011 | ............ B62D 21/04 |
| WO | 2013156639 A1 | 10/2013 | |
| WO | 2015056168 A1 | 4/2015 | |
| WO | WO-2019106452 A1 * | 6/2019 | ............. B60B 27/06 |

OTHER PUBLICATIONS

J. Greil, WO 2011/023681 Machine English transliation, ip.com (Year: 2011).*

(56) References Cited

OTHER PUBLICATIONS

Supplementary European Search Report of 17773425.8; The Hague; dated Nov. 8, 2019; Simens, Mark Phil.
English Abstract of JP2011111115; Retrieved on Nov. 20, 2019; Retrieved from www.worldwide.espacenet.com.
International Search Report of PCT/IB2017/051878; dated Jul. 19, 2017; Blaine R. Copenheaver.
English Abstract of JP2000177669; Retrieved on Sep. 28, 2018; Retrieved from www.worldwide.espacenet.com.
English Abstract Translation of DE102009038834 which is the Priority of EP2470390; Retrieved on Sep. 28, 2018; Retrieved from www.translationportal.epo.org.
English Abstract of JP2005239032; Retrieved on Sep. 28, 2018; Retrieved from www.worldwide.espacenet.com.
English Abstract of JP2000118469; Retrieved on Sep. 28, 2018; Retrieved from www.worldwide.espacenet.com.
Screen captures from YouTube video clip entitled "XR3 Hybrid 125-mpg Three Wheel Vehicle", uploaded on Jul. 11, 2014 by user "Robert Riley". Retrieved from Internet: <https://www.youtube.com/watch?v=n4FQF8ziwng>.
Victory Series, Pride Mobility Products Corp., Owner's Manual, Feb. 2012.
Office Action issued in corresponding Chinese patent application No. 201780027846.6 dated Sep. 15, 2020.

\* cited by examiner

VEHICLE HAVING SEPARABLE DRIVER AND PROPULSION MODULES

CROSS-REFERENCE

The present application claims priority to United States Provisional Application No. 62/316,217, filed Mar. 31, 2016, the entirety of which is incorporated herein by reference.

FIELD OF TECHNOLOGY

The present technology relates to a vehicle having separable driver and propulsion modules.

BACKGROUND

In order to reduce the number of parts, simplify manufacturing, and therefore costs, some vehicle manufacturers use a common platform across multiple vehicle models. In the car industry, such a platform typically includes the lower frame which defines the locations for the engine and other components, suspensions, steering mechanism, drive elements (i.e. drive axles, driveshaft, etc.). The model specific components such as the wheels, engine, transmission, upper frame, vehicle body, vehicle interior and other systems such as the air intake, exhaust and fuel systems, are then connected to the platform.

As would be appreciated, there are still a lot of components to be attached to the platform. Also, the general dimensions of all the car models using the common platform are dictated by the wheelbase and axle track which is fixed for the platform.

Additionally, although this type of platform is suitable for cars, it is less suitable for smaller mobility vehicles such as two or three-wheel straddle seat vehicles. Such small mobility vehicles have a different type of frame than cars. This type of frame does not necessarily allow for the easy separation between a lower components and upper components as in cars. Additionally, these small mobility vehicles, due to their small sizes, have a more compact arrangement of their components, making the separation of certain components into a common unit to be used across models difficult.

There is therefore a need for a vehicle in which the car industry's concept of a common platform has been adapted to the constraints of smaller mobility vehicles.

SUMMARY

It is an object of the present technology to ameliorate at least some of the inconveniences present in the prior art.

One aspect of the present technology provides a vehicle having a driver module and a propulsion module. The driver module and the propulsion module can be separated from each other as independent units. By having two such independent modules, the various components of the vehicle can be assembled along two separate assembly chains to assemble the two modules that are then connected to each other once both modules are completed.

Having independent driver and propulsion modules also allows the manufacturer flexibility to easily create a large number of vehicle models from a small number of driver modules and propulsion modules each sharing common connection features.

According to one aspect of the present technology, there is provided a vehicle having a driver module and a propulsion module selectively connected to the driver module. The driver and propulsion modules are separable from each other as independent units. The driver module has a driver module frame, at least one front wheel operatively connected to the driver module frame, at least one front suspension assembly operatively connecting the at least one front wheel to the driver module frame, and a seat connected to the frame. The propulsion module has a propulsion module frame, at least one rear wheel operatively connected to the propulsion module frame, at least one rear suspension assembly operatively connecting the at least one rear wheel to the propulsion module frame, a motor operatively connected to the at least one rear wheel, and an energy storage device operatively connected to the motor.

In some implementations of the present technology, the driver module also has a steering assembly supported by the driver module frame and operatively connected to the at least one wheel.

In some implementations of the present technology, the driver module frame defines a channel. At least a portion of the propulsion module is received in the channel when the propulsion module is connected to the driver module.

In some implementations of the present technology, the channel is open at a bottom thereof. At least the portion of the propulsion module closes the bottom of the channel when the propulsion module is connected to the driver module.

In some implementations of the present technology, the channel is disposed below the seat.

In some implementations of the present technology, the at least one front wheel is two front wheels. A width of the channel is smaller than a lateral distance between the two front wheels.

In some implementations of the present technology, the propulsion module is fastened to a bottom of the driver module to connect the propulsion module to the driver module.

In some implementations of the present technology, when the propulsion module is connected to the driver module, at least one of the motor, the energy storage device and the at least one rear wheel is disposed below the seat.

In some implementations of the present technology, the driver module also has at least one first connector. The propulsion module also has at least one second connector. The at least one first connector is connected to the at least one second connector when the propulsion module is connected to the driver module for transmitting at least one of electrical power and electronic signals between the driver module and the propulsion module.

In some implementations of the present technology, the motor is an electric motor, the energy storage device is at least one battery cell, and the at least one first connector and the at least one second connector are low voltage connectors.

In some implementations of the present technology, the motor is an electric motor, and the energy storage device is at least one battery cell.

In some implementations of the present technology, the at least one rear suspension assembly includes a swing arm pivotally connecting the at least one rear wheel to the frame. The electric motor is connected to and movable with the swing arm.

In some implementations of the present technology, the propulsion module also has a charging control unit electrically connected to the at least one battery cell, and a charging plug electrically connected to the charging control unit, the charging plug permitting connection to an external electrical power source.

In some implementations of the present technology, the driver module also has a speed control operator to be operated by a driver of the vehicle. The propulsion module also has a motor control unit electrically connected to the electric motor. The motor control unit is electronically connected to the speed control operator.

In some implementations of the present technology, the propulsion module also has a diagnostic connector for connection to an external vehicle diagnostic tool. The diagnostic connector is electrically connected to at least one of the electric motor and the at least one battery cell.

In some implementations of the present technology, the electric motor is disposed longitudinally between the at least one battery cell and the at least one rear wheel.

In some implementations of the present technology, the motor is an internal combustion engine, and the energy storage device is a fuel tank.

In some implementations of the present technology, the propulsion module also has a plenum fluidly connected to the engine, and a transmission operatively connecting the engine to the at least one rear wheel.

In some implementations of the present technology, the fuel tank has a removable fuel filler cap. The fuel filler cap is accessible through an aperture in the driver module when the driver module is connected to the propulsion module.

In some implementations of the present technology, the driver module also has a storage compartment.

In some implementations of the present technology, the at least one front wheel is two front wheels.

In some implementations of the present technology, the at least one rear wheel is a single rear wheel.

In some implementations of the present technology, the seat is a straddle seat.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
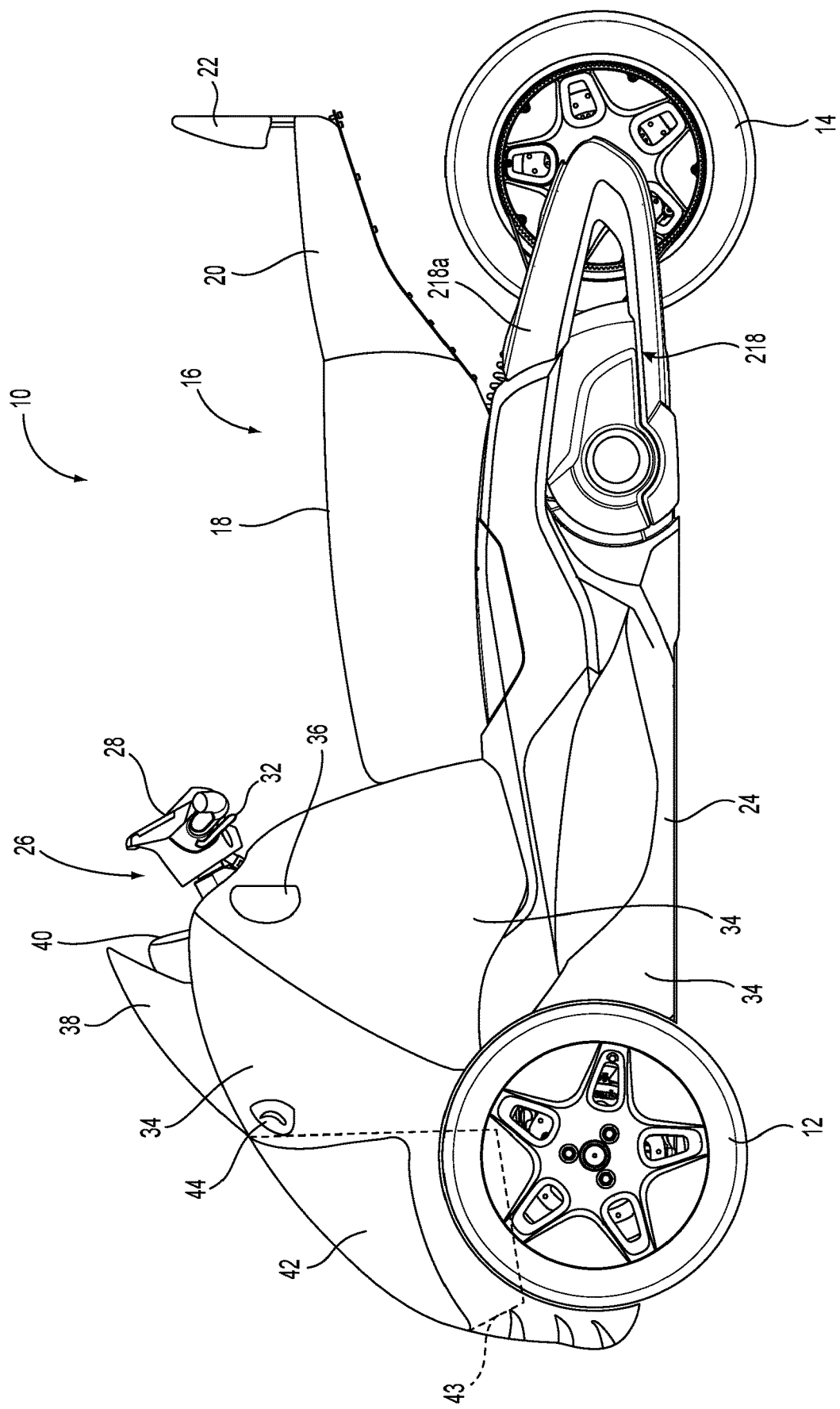
FIG. 1 is a left side elevation view of a three-wheel vehicle having a straddle seat.
Figure 2:
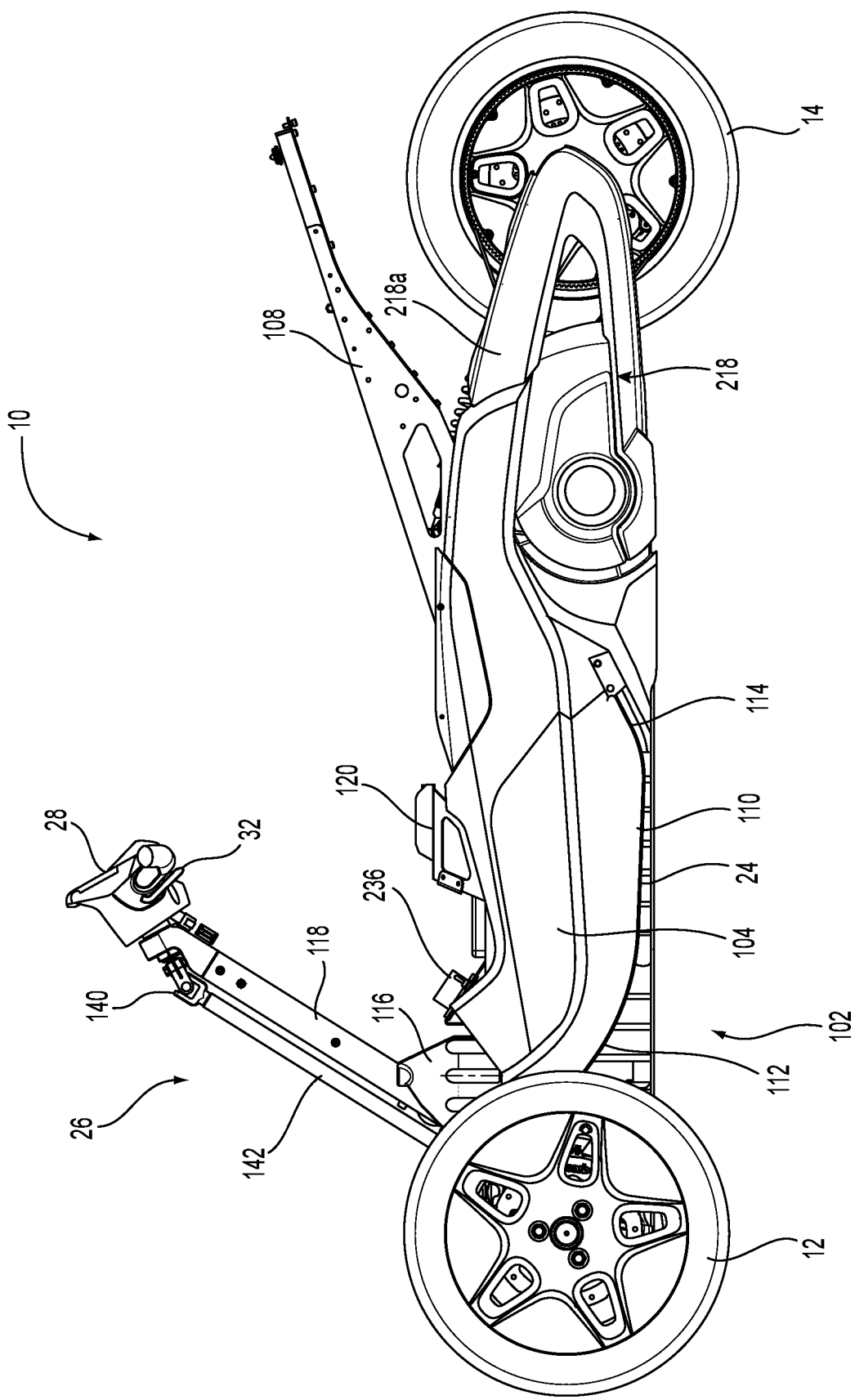
FIG. 2 is a left side elevation view of the vehicle of FIG. 1 with some of the body panels and the seat removed.
Figure 3:
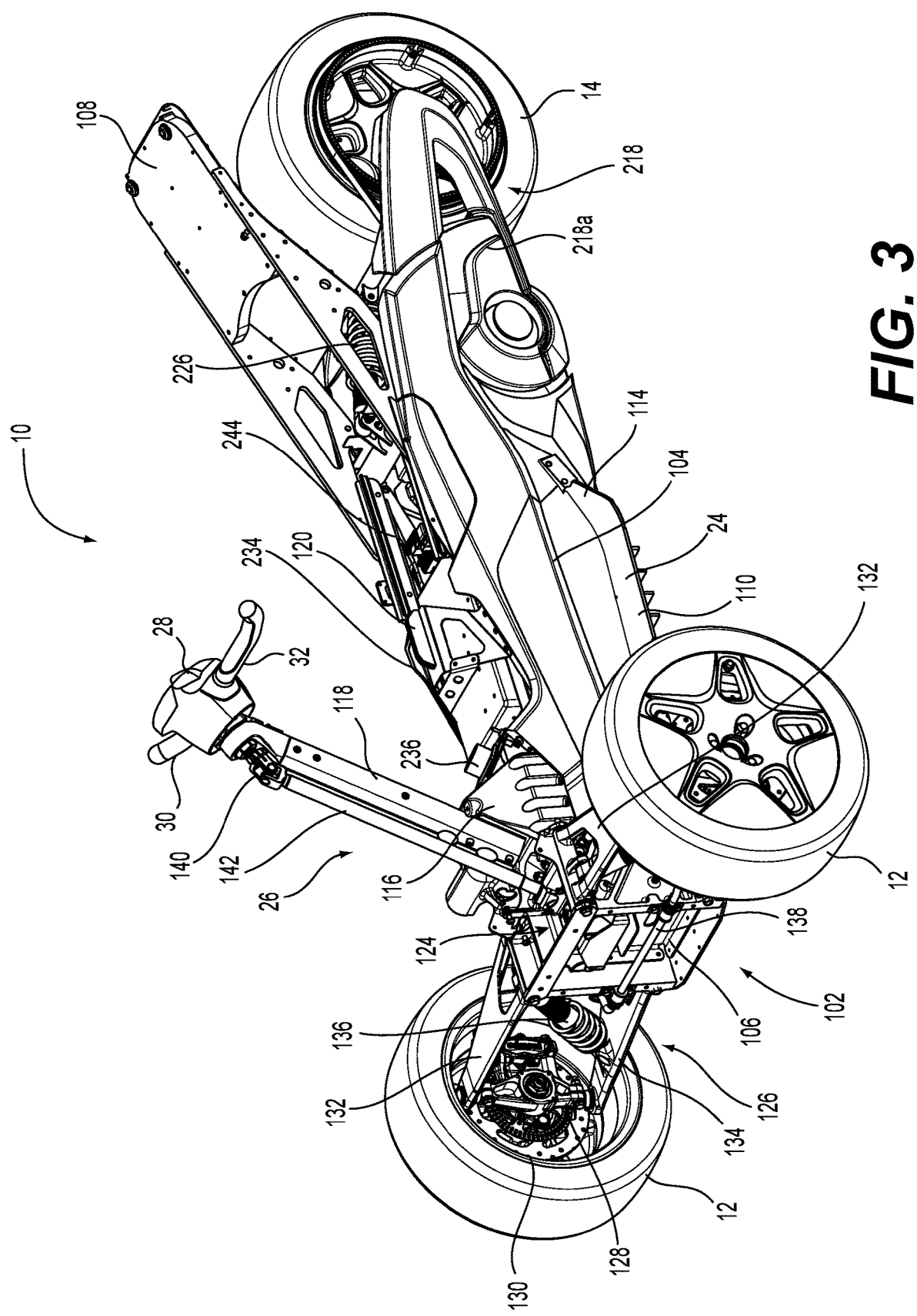
FIG. 3 is a perspective view taken from a front, left side of the vehicle components of FIG. 2.

With reference to FIGS. 1 to 3, a vehicle 10 has two front wheels 12, a single rear wheel 14. The vehicle 10 is provided with straddle seat 16 having a driver portion 18 and a passenger portion 20. As can be seen, the passenger portion 20 is provided with a backrest 22 at a rear thereof. A majority of the rear wheel 14 is disposed below the seat 16. Footrests 24 are provided on either side of the straddle seat 16 to accommodate the feet the driver of the vehicle 10.

A steering assembly 26 is operatively connected to the front wheels 12 to steer the vehicle 10. The steering assembly 26 includes a handlebar 28 disposed forward of the straddle seat 16. The handlebar 28 has a speed control lever 30 used by the driver to control a speed of the vehicle 10 and a brake lever 32 used by the driver for braking the vehicle 10. It is contemplated that the speed control lever 30 could be replaced by another type of speed control operator such as a twistgrip or a speed control pedal. Similarly, it is contemplated that the brake lever 32 could be replaced by another type of brake operator such as a brake pedal. It is also contemplated that the handlebar 28 could be replaced by a steering wheel or another type of steering control device.

The vehicle 10 has a number of body panels 34 that define an outer shell of the vehicle 10. Rear view mirrors 36 extend laterally from body panels 34 on either side of the handlebar 28. A windshield 38 is disposed on top of a front body panel 34 forward of the handlebar 28 to deflect wind when the vehicle 10 is moving forward. A display cluster 40 is provided longitudinally between the windshield 38 and the handlebar 28. The display cluster 40 has various displays for displaying information to the driver such as vehicle speed, battery charge level and the like. The vehicle 10 also has a hood 42 that can be tilted open to access a storage compartment 43 (shown in dotted lines in FIG. 1). Headlights 44 are also provided on either side of the vehicle 10.

The vehicle 10 has many other features and components, some of which will be described in more detail below.

Figure 8:
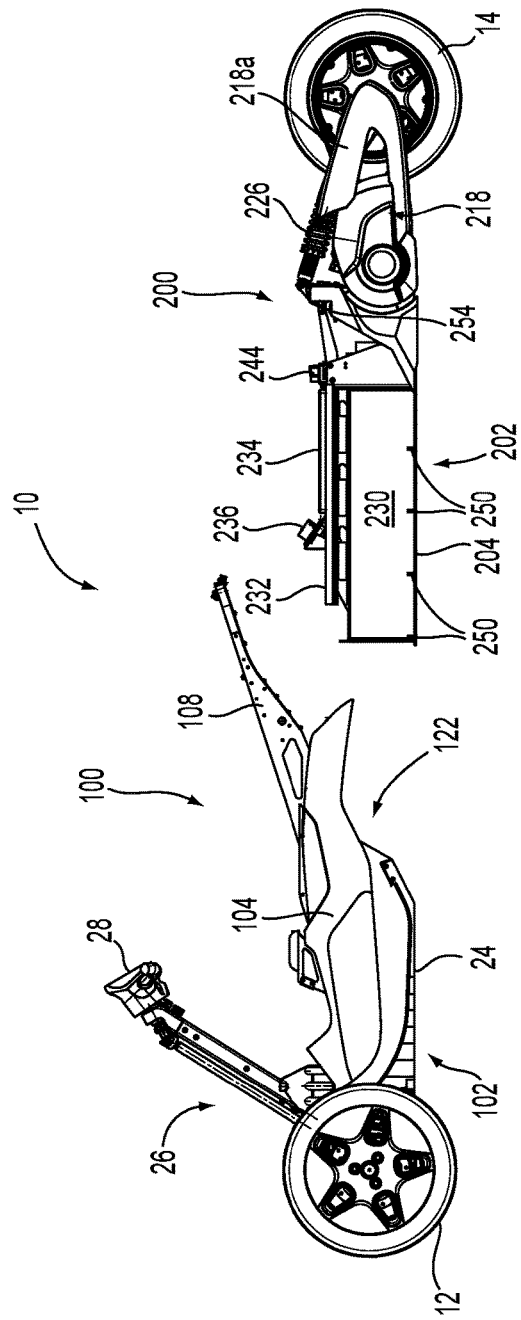
FIG. 8 is a left side elevation view of the vehicle of FIG. 1 with the driver module components of FIG. 5 and the propulsion module of FIG. 7 separate from each other.
Figure 9:
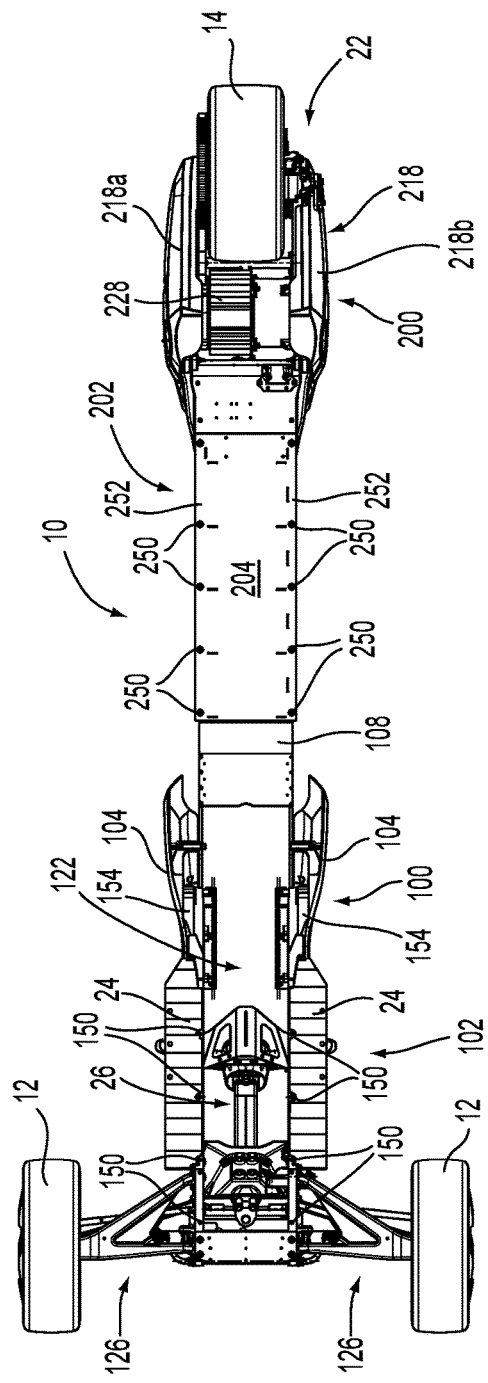
FIG. 9 is a bottom plan view of the vehicle of FIG. 1 with the driver module components of FIG. 5 and the propulsion module of FIG. 7 separate from each other.

As shown in FIGS. 8 and 9, the vehicle 10 is separable into two independent modules 100, 200. All of the components of the vehicle 10 are provided on the modules 100, 200. The module 100 is referred to herein as the driver module 100. The module 200 is referred to herein as the propulsion module 200. The driver module 100 includes the front wheels 12, the body panels 34, the hood 42, the headlights 44 and the components of the vehicle 10 provided for the driver such as the seat 16, the footrests 24, the steering assembly 26, the levers 30, 32, the rear view mirrors 36, the windshield 38 and the display cluster 40, hence the name driver module 100. The propulsion module 200 includes the rear wheel 14 and the components of the vehicle 10 used for driving the rear wheel 14 and propel the vehicle 10, hence the name propulsion module 200. It is contemplated that a small number of components of the vehicle 10 could be provided separately from the two modules 100, 200. It is contemplated that the modules 100, 200 could not have all of the components listed above. The modules 100, 200 will be described in more detail below.

By having two such independent modules 100, 200, the various components of the vehicle 10 can be assembled along two separate assembly chains to assemble the two modules 100, 200 that are then connected to each other once both modules 100, 200 are completed.

Having independent driver and propulsion modules 100, 200 also allows the manufacturer flexibility to easily create a large number of vehicle models from a small number of driver modules and propulsion modules each sharing common connection features. For example, the manufacturer could have a "touring" driver module emphasizing comfort and storage such as the one illustrated in FIG. 1, and a "sport" driver module emphasizing aerodynamics and light weight. In this same example, the manufacturer could provide an electrical propulsion module such as the one illustrated in FIG. 7 and an internal combustion propulsion module such as the one illustrated in FIG. 11. From these two driver modules and two propulsion modules, the manufacturer can produce four different models of vehicle.

It is contemplated that the driver and propulsion modules can also be provided in different colors and option packages, thereby offering even more different combinations. It is also contemplated that driver modules having a single front wheel 12 could be provided. Driver modules having a seat for accommodating a single rider or more than two riders and/or having a different kind of seat(s) are also contemplated. Driver modules having different lengths and widths are also contemplated. Propulsion modules having differently sized power packs that offer different ranges, such as the ones shown in FIGS. 5 and 10, and/or more or less powerful electrical motors/engines are also contemplated. It is also contemplated that propulsion modules having two rear wheels 14 could be provided. Propulsion modules having different lengths and widths are also contemplated.

The driver module 100 and the propulsion module 200 will now be described in more detail below. Propulsion modules 300 and 400 that are alternative implementations of the propulsion module 200 and that can be connected to the driver module 100 will be described in more detail below with respect to FIGS. 10 and 11.

Figure 5:
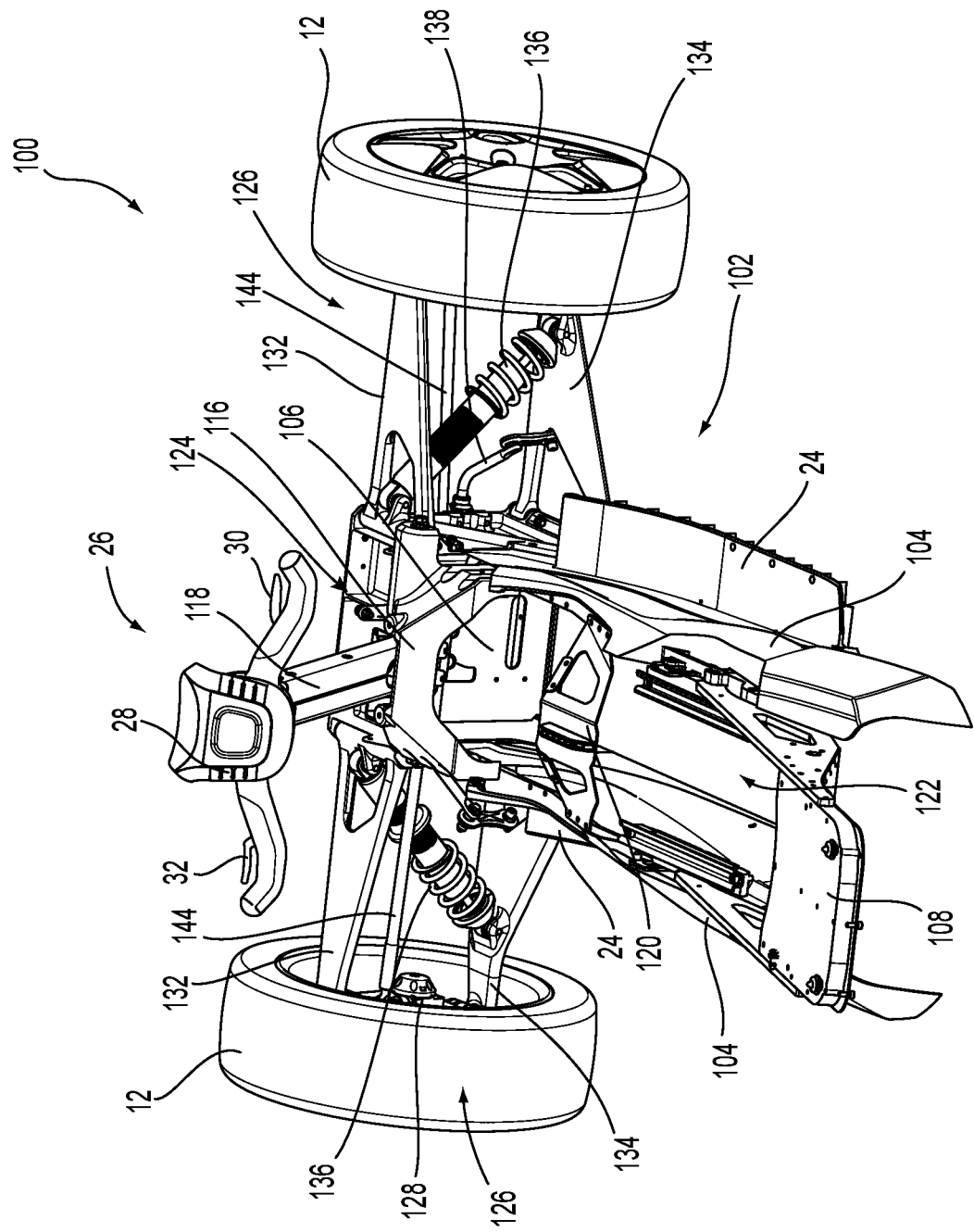
FIG. 5 is a perspective view taken from a top, rear, right side of a driver module of the vehicle of FIG. 1 with some of the body panels and the seat removed.
Figure 6:
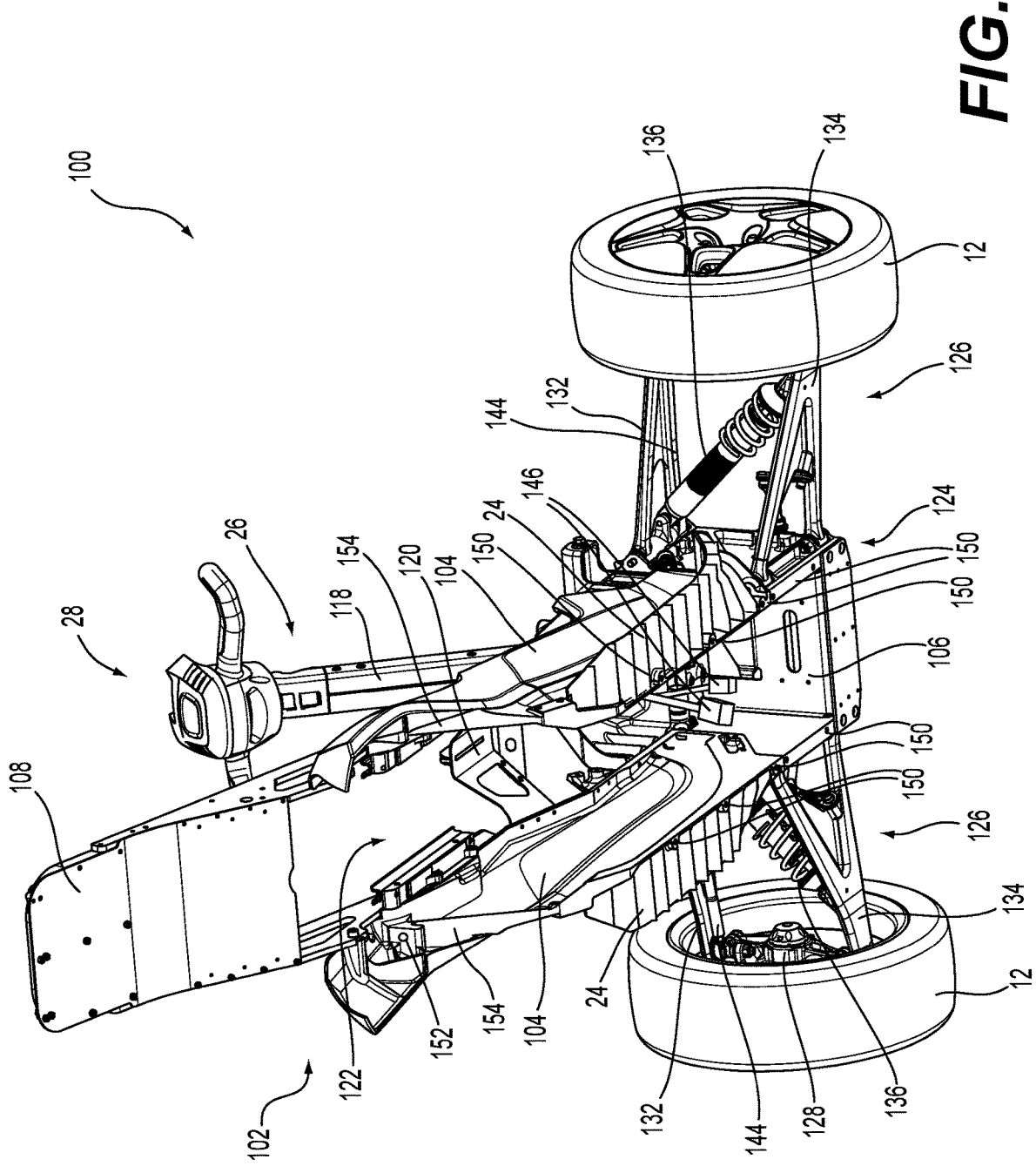
FIG. 6 is a perspective view taken from a bottom, rear, right side of the components of the driver module of FIG. 5.

With reference to FIGS. 5 and 6, the driver module 100 has a driver module frame 102. The driver module frame 102 has left and right side walls 104. A front wall 106 extends between and is connected to the left and right side walls 104 at a front thereof. A seat frame assembly 108 is connected to a top of the left and right side walls 104 at a rear thereof. The seat frame assembly 108 extends upward and rearward from the left and right side walls 104. The seat frame assembly 108 provides the structure for the attachment of the seat 18 to the vehicle 10. The left and right footrests 24 extend laterally outward from the lower edges of the left and right side walls 104 respectively. As best seen in FIG. 2 for the left footrest 24, each footrest 24 has a central portion 110 that extends slightly upward from a rear to a front thereof, a front portion 112 that extends forward and upward from the central portion 110, and a rear portion 114 that extends rearward and upward from the central portion 110. The driver module frame 102 also has a generally pyramidal support 116 connected to the top of the left and right side walls 104 at the front thereof. A steering mast 118 is connected to a front of the support 116 and extends upward and rearward. The steering mast 118 supports a portion of the steering assembly 26 as will be explained in more detail below. A bracket 120 is connected to and extends laterally between the top of the left and right side walls 104 at a position longitudinally between the seat frame assembly 108 and the support 116. The side walls 104, the seat frame assembly 108, the bracket 120 and the support 116 define a channel 122, best seen in FIG. 6, that receives a portion of the propulsion module 200 therein when the driver module 100 and the propulsion module 200 are connected to each other. The channel 122 is disposed below the seat 16, is opened at a rear thereof and is partially closed at a front thereof by the front wall 106. As can be seen in FIG. 6, the width of the channel 122 is smaller than a lateral distance between the front wheels 12. The driver module frame 102 also includes a suspension frame assembly 124 connected to the front of the left and right side walls 104 laterally outward of the channel 122. Left and right front suspension assemblies 126 connect the left and right front wheels 12 to the suspension frame assembly 124 as will be described in more detail below. The front wall 106, and hence the forward end of the channel 122, is between the left and right front suspension assemblies 126. The body panels 34 are connected to the driver module frame 102.

Each front wheel 12 is connected to a hub (not shown) that is rotatably connected to a kingpin 128 (see FIGS. 3 and 6). Each front wheel 12 is provided with a disk brake assembly 130 that is operated via the brake lever 32 provided on the handlebar 28. As described above, each front wheel 12 is operatively connected to the suspension frame assembly 124 via a front suspension assembly 126. Each front suspension assembly 126 has an upper A-arm 132, a lower A-arm 134 and a shock absorber 136. Each kingpin 128 is pivotally connected between the laterally outer ends of it corresponding upper and lower A-arms 132, 134 such that the corresponding front wheel 12 can be steered. The laterally inner ends of the upper and lower A-arms 132, 134 are pivotally connected to the suspension frame assembly 124. Each shock absorber 136 is pivotally connected between its corresponding lower A-arm 132 and the suspension frame assembly 124. A torsion bar 138 has a central portion pivotally connected to the front of the suspension frame assembly 124. The ends of the torsion bar 138 are pivotally connected to the two lower A-arms 134.

As described above, the steering assembly 26 includes the handlebar 28. The handlebar 28 is pivotally connected to the top of the mast 118. A shaft (not shown) is connected to the handlebar 28 and extends through the mast 118. This shaft is connected to a universal joint 140 which is connected to a steering column 142. The steering column 142 extends in front of the mast 118. The lower end of the steering column 142 is housed within the suspension frame assembly 124 between the left and right sets of upper and lower A-arms 132, 134 and in front of the front wall 106. The lower end of the steering column 142 is connected to a pitman arm (not shown) that is operatively connected to a left tie rod 144 and a to a right tie rod 144. The laterally outer ends of the tie rods 144 are pivotally connected to their corresponding kingpin 128. As a result, when the handlebar 28 is turned by the driver, the front wheels 12 are steered in a corresponding direction.

The driver module 100 also has a pair of low-voltage connectors 146 (FIG. 6). In one implementation, the connectors 146 are 12 volt connectors. The connectors 146 serve to connect the electric and electronic components of the driver module 100, such as the display gauge 40, the headlights 44, a power steering unit (not shown), a vehicle stability system (not shown), the levers 30, 32, and any sensors provided on the driver module 100, such as a steering position sensor, to the propulsion module 200, as will be described in greater detail below. It is contemplated that more or less than two connectors 146 could be provided.

Figure 7:
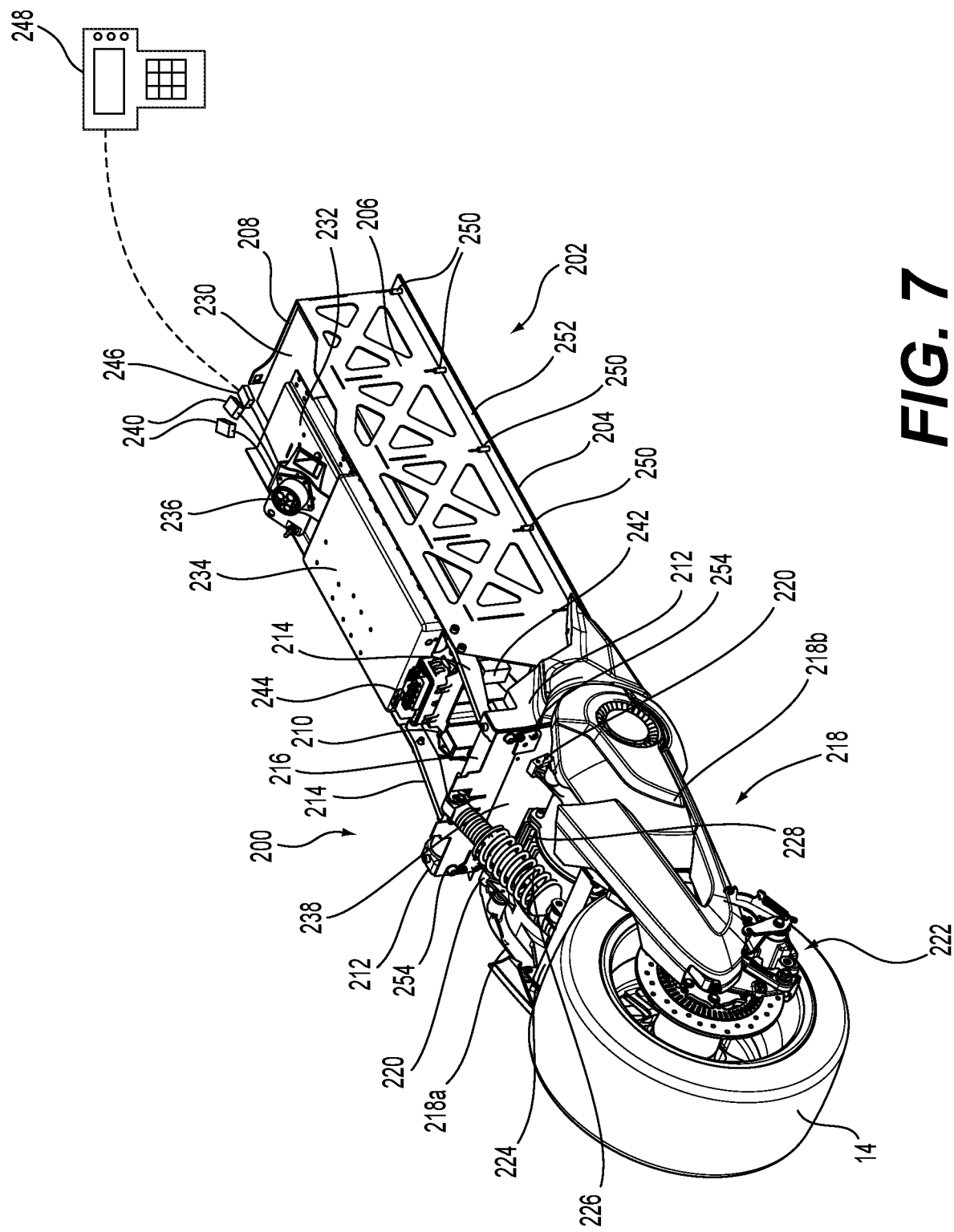
FIG. 7 is a perspective view taken from a rear, right side of a propulsion module of the vehicle of FIG. 1.

With reference to FIG. 7, the propulsion module 200 has a propulsion module frame 202. The propulsion module frame 202 has a base plate 204. A right side wall 206 and a front wall 208 are connected to the right and front of the base plate 204 respectively. A left side bracket 210 is connected to the left side of the base plate 204 in longitudinal alignment with the rear portion of the right side wall 206. Left and right rear brackets 212 are connected to the left and right of the base plate 204 respectively behind the left side bracket 210 and the right side wall 206 respectively. A right link 214 is connected between the upper end of the rear end of the right side wall 206 and the upper end of the right rear bracket 212. A left link 214 is connected between the upper ends of the left side bracket 210 and the left rear bracket 212. A tubular frame member 216 is connected between the upper ends of the rear brackets 212.

A swing arm 218 is formed from left and right swing arm portions 218*a*, 218*b*. The left and right swing arm portions 218*a*, 218*b* are pivotally connected to the left and right rear brackets 212 respectively. Bumpers 220 connected to the top of the swing arm portions 218*a*, 218*b* make contact with the rear brackets 212 when the swing arm 218 pivots upward by a certain amount to limit the travel of the swing arm 218. The rear wheel 14 is disposed between the swing arm portions 218*a* and 218*b* and is rotationally connected to the rear portions of the swing arm portions 218*a*, 218*b*. A disk brake assembly 222 is provided on the right side of the rear wheel 14. The disk brake assembly 222 is actuated in response to actuation of the brake lever 32 when the driver and propulsion modules 100, 200 are connected together. A tubular frame member 224 is connected between the tops of the swing arm portions 218*a*, 218*b* in front of the rear wheel 14. A shock absorber 226 is connected between the tubular frame member 224 and the tubular frame member 216, thereby forming a rear suspension assembly.

Figure 4:
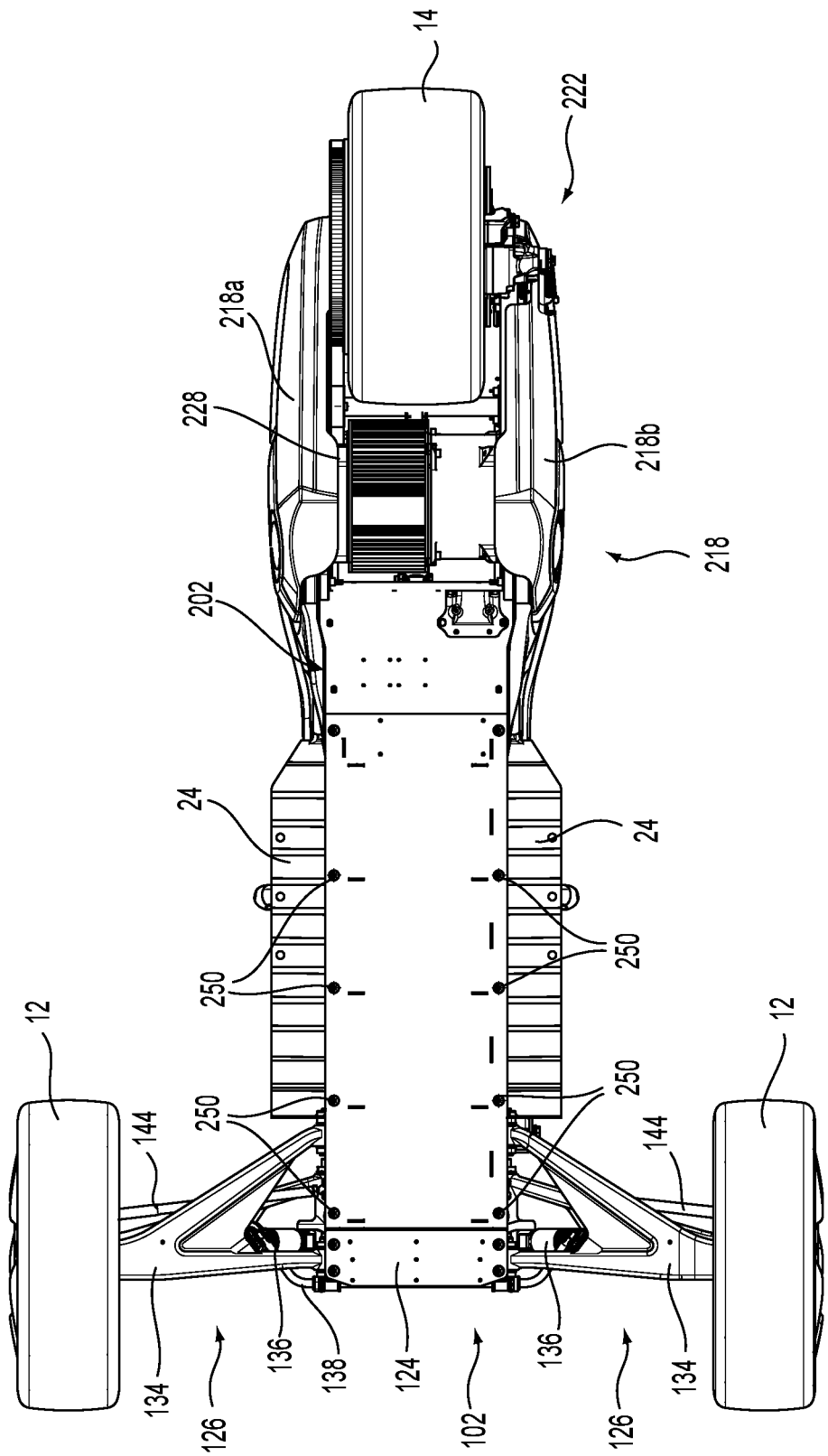
FIG. 4 is a bottom plan view of the vehicle components of FIG. 2.

An electric motor 228 is disposed in the space between the left and right swing arm portions 218*a*, 218*b* and in front of the rear wheel 14. The electric motor 228 is disposed proximate the left swing arm 218*a* (see FIG. 4) and pivots with the swing arm 218 relative to the propulsion module frame 202. When the driver and propulsion modules 100, 200 are connected together, the electric motor 228 is disposed below the seat 16. The electric motor 228 drives the rear wheel 14 via a toothed belt and sprockets (not shown) provided on the output shaft of the motor 228 and on the left side of the rear wheel 14. It is contemplated that the electric motor 228 could drive the rear wheel via a chain instead of a toothed belt. It is also contemplated that the toothed belt and sprockets could be replaced by another torque transmission mechanism such as a gear set for example. It is contemplated that the electric motor 228 could be connected proximate the right swing arm portion 218*b* or centrally within the swing arm 218. The electric motor 228 is controlled in response to actuation of the speed control lever 30 when the driver and propulsion modules 100, 200 are connected together.

The energy storage device used to power the electric motor 228 is a high-voltage battery pack 230 containing a plurality of battery cells and a battery management system (not shown) for, inter alia, monitoring cell charge and temperature. In one implementation, the battery pack 230 is a 96 6 volt battery pack, but other voltages are contemplated. The high-voltage electrical components, primarily the battery pack 230 and the electric motor 228, are all located in the propulsion module 200. As such, maintenance of the driver module 100 is made simpler by eliminating concerns associated with high-voltage. The battery pack 230 is mounted on the base plate 204 and abuts the right side wall 206 and the front wall 208. When the driver and propulsion modules 100, 200 are connected together, the battery pack 230 is disposed below the seat 16. A plate 232 is provided above the battery pack 230. A charging control unit 234 is provided on the plate 232 and is electrically connected to the battery cells of the battery pack 230. A charging plug 236 is provided on the plate 232 forward of the charging control unit 234. The charging plug 236 is electrically connected to the charging control unit 234. When the charging plug 236 is connected to an external electrical power source, such as by a power cord plugged into an electrical wall outlet, the charging control unit 234 controls the current and voltage being provided to the battery cells of the battery pack 230 to recharge them evenly and to avoid overcharging and/or overheating of the batteries. As can be seen in FIGS. 2 and 3, the charging plug 236 is disposed in an open space in the top of the driver module frame 102 in front of the bracket 120 when the modules 100, 200 are connected to each other, thus making the charging plug 236 easily accessible.

The battery pack 230 also delivers electrical power to components of the vehicle 10 other than the electrical motor 228. A DC-DC converter 238 is electrically connected between the battery pack 230 and these components in order to supply these components with electricity at a lower voltage lever than the one supplied directly from the battery pack 230. In one implementation, the DC-DC converter 238 converts the 96 volt voltage of the battery pack 230 to 12 volt voltage. The DC-DC converter 238 is disposed on the base plate 204, behind the battery pack 230 and below the tubular frame member 216. To supply electrical power to the electrical components on the driver module 100 such as the display cluster 40 and the headlights 44, the DC-DC converter 238 is connected to a low-voltage connector 240 on the propulsion module 200 that is connected to one of the previously mentioned connectors 146 on the driver module 100 which is connected to these electrical components on the driver module 100.

A motor control unit 242 is provided on the base plate 204, behind the battery pack 230 and in front of the DC-DC converter 238. The motor control unit 242, as its name suggests, controls the operation of the electric motor 228. The motor control unit 242 receives electrical power from the battery pack 230 and controls its supply to the electric motor 228 based on electronic signals received from various sensors (not shown) provided on the vehicle 10 and from the speed control lever 30. To receive the electronic signals from the speed control lever 30 that is provided on the driver module 100, the motor control unit 242 is connected to another low-voltage connector 240 on the propulsion module 200 that is connected to one of the previously mentioned connectors 146 on the driver module 100 which is connected to the speed control lever 30. This connector 146 is also connected to sensors (not shown) on the driver module 200 to provide electronic signals from these sensors to the motor control unit 242. This connector 146 is also connected to the display cluster 40 such that the display cluster 40 can receive electronic signals from the motor control unit 242 and the battery pack 230 to display the associated information to the driver, such as vehicle speed and state of charge. In one implementation, the low-voltage connectors 240 are 12 volt connectors. The electronic signals are exchanged between the motor control unit 242, the sensors, the speed control lever 30 and the display cluster 40 using the CAN (controller area network) communication protocol, but it is contemplated that other communication protocols could be used. It is contemplated that more or less than two connectors 240 could be provided.

In order to provide overcurrent protection to the various electrical components of the vehicle 10, a fuse box 244 is provided. The fuse box 244 is disposed on top of the motor control unit 242. The fuses in the fuse box 244 are electrically connected between the battery pack 230 or the DC-DC converter 238 and their associated electrical components. As can be seen in FIG. 3, the fuse box 244 is disposed in an open space in the top of the driver module frame 102 behind of the bracket 120 when the modules 100, 200 are connected to each other, thus making the fuse box 244 easily accessible via, for example, removal of the straddle seat 16.

A diagnostic connector 246 is also provided in the propulsion module 200. The diagnostic connector 246 is electrically connected to the electric motor 228 via the motor control unit 242, to the motor control unit 242, and to the battery pack 230 via the battery management system. The diagnostic connector 246 permits connection to an external vehicle diagnostic tool 248 such that a technician doing maintenance on the vehicle 10 can easily obtain diagnostic information from the vehicle 10.

To permit connection of the propulsion module 200 to the driver module 100, the base plate 204 has four apertures on each lateral side thereof into which threaded fasteners 250 are inserted upwards, from below the base plate 204. The fasteners 250 (and the apertures) are in the borders 252 of the base plate 204 that are disposed laterally between the lateral sides of the base plate 204 and the battery pack 230, as can be seen in FIG. 7 for the four right apertures and right fasteners 250. As can be seen in FIG. 6, the driver module 100 is provided with four corresponding threaded apertures 150 on each side of the channel 122 in a bottom of the driver module frame 102. More specifically, the left and right most forward threaded apertures 150 are provided in a bottom of the suspension frame assembly 124 and the remaining three left and three right threaded apertures 150 are provided in the bottom of the left and right side wall 104 respectively. The propulsion module 200 is further provided with additional apertures (not shown) through the upper end of each of the brackets 212 on either side of the tubular frame member 216. Threaded fasteners 254 are inserted forward, from behind each bracket 212 into corresponding threaded apertures 152 (only one of which is shown in FIG. 6) provided in rear flanges 154 (FIG. 6) of the left and right side wall 104.

To connect the propulsion module 200 to the driver module 100, the propulsion module 200 is placed on a support (not shown), such as a jack, such that the base plate 204 is generally horizontal. The driver module 100 is then positioned on the propulsion module 200 such that the battery pack 230 and the other components on the base plate 204 are received in the channel 122 and such that the bottom of the side walls 104 rest on the borders 252 of the base plate 204. The position of the driver module 100 is then adjusted to align the apertures 150 with the corresponding apertures in the base plate 204. The threaded fasteners 250 are then inserted in the apertures in the base plate 204 and the threaded apertures 150 such that the base plate 204 closes the bottom of the channel 122. The threaded fasteners 254 are then inserted in the apertures in the end brackets 212 and the threaded apertures 152. The connectors 240 are then connected to the connectors 146. It is also contemplated that a hydraulic or mechanical brake line for connecting the disk brake assembly 222 to the brake lever 32, a portion of which is in the driver module 100 and a portion of which is in the propulsion module 200, be connected. Finally, the support is removed.

To disconnect the propulsion module 200 from the driver module 100, the support is placed under the base plate 204 of the propulsion module 200. The connectors 240 are then disconnected from the connectors 146. The fasteners 250, 254 are then unfastened. The driver module 100 can then be moved away from the propulsion module 200. Finally, the support is removed, if desired.

Figure 10:
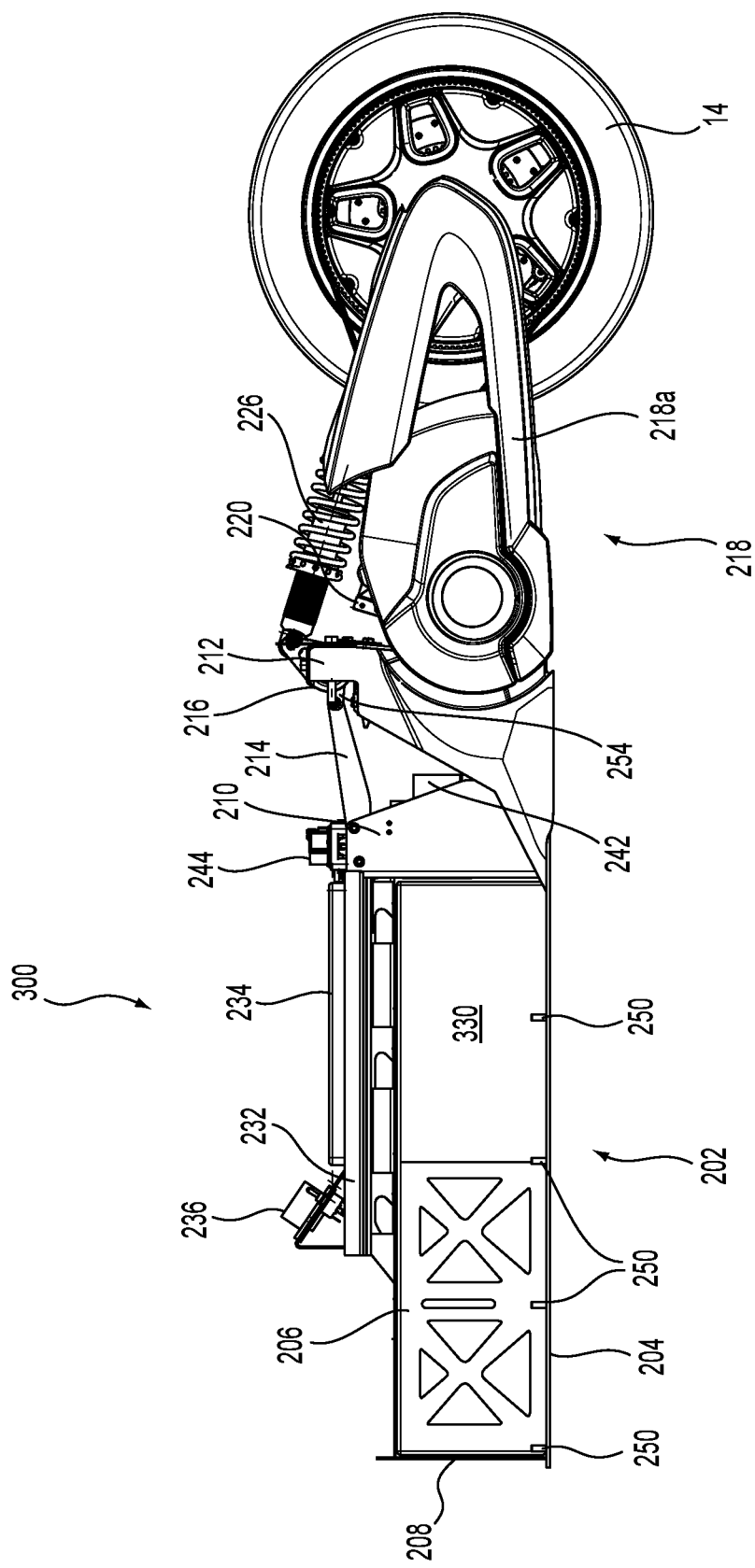
FIG. 10 is a left side elevation view of an alternative implementation of a propulsion module of the vehicle of FIG. 1.
Figure 11:
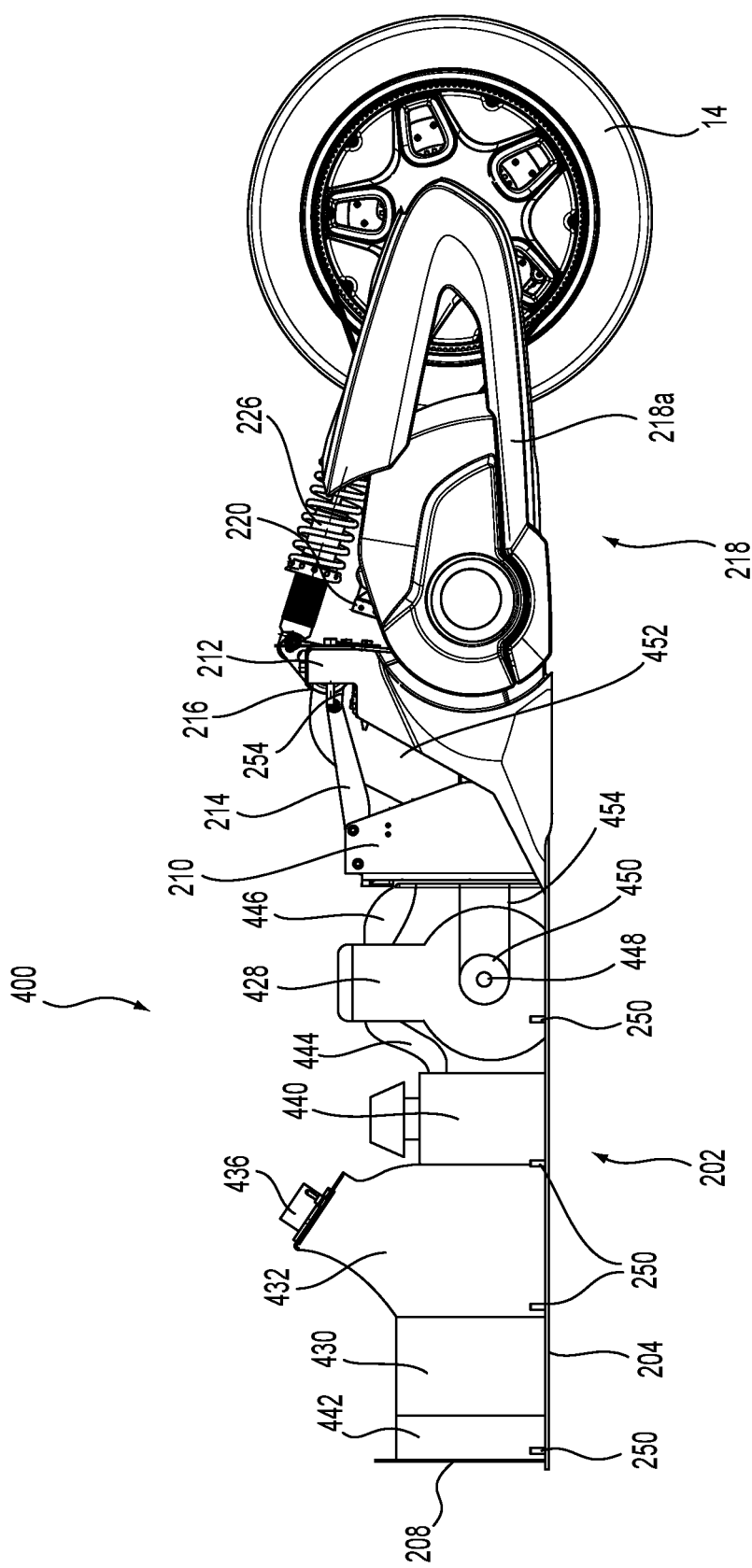
FIG. 11 is a left side elevation view of another alternative implementation of a propulsion module of the vehicle of FIG. 1.

Turning now to FIGS. 10 and 11, propulsion modules 300 and 400, which are alternative implementation of the propulsion modules 200, will be described. For simplicity, components of the propulsion modules 300 and 400 that are the same as those of the propulsion module 200 have been labeled with the same reference numerals and will not be described again. As should be appreciated, the propulsion modules 300 and 400 both have the base plate 204 and the apertures for fasteners 250 and as such can both be connected to the driver module 100 in the same manner as the propulsion module 200.

The propulsion module 300 is shown in FIG. 10. The propulsion module 300 is identical to the propulsion module 200 except that the battery pack 230 has been replaced by a smaller battery pack 330. As such the front of the battery pack 330 is spaced from the front wall 208. In the propulsion module 200, the battery pack 230 is a 96 volt battery pack. The battery pack 330 is a 48 volt battery pack. Battery packs of other voltages are also contemplated. It is also contemplated that the battery pack 330 could be smaller in size but not in voltage by using higher capacity batteries. It is contemplated that the space between the front wall 208 and the battery pack 330 could be used to provide a storage bin. It is also contemplated that an alternate battery pack could be the same size as the battery pack 230 but be composed of different battery cells having a higher or lower energy density and therefore a higher or lower voltage.

The propulsion module 400 is shown in FIG. 11. In the propulsion module 400, the electric motor 228, the battery pack 230 and their associated components have been replaced to provide the propulsion module 400 with a different kind of motor. This motor is a four-stroke internal combustion engine 428. It is contemplated that other types of internal combustion engines, such a two-stroke internal combustion engine, could be provided. In order to operate the engine 428, many components are required. The main ones are described below.

A control unit 442 receiving signals from the various sensors and the speed control lever 30 controls the operation of the engine 428. The control unit 442 is mounted to the base plate 204 adjacent to a rear side of the front wall 208. A battery 430 is mounted to the base plate 204 behind the control unit 442. The battery 430 provides the electric power necessary to actuate a starter motor (not shown) of the engine 428 that is used to start the engine 428. A fuel tank 432 is mounted to the base plate 204 behind the battery 430. The fuel tank 432 stores the fuel to be supplied to the engine 428, as such the fuel tank 432 acts as the energy storage device in the propulsion module 400. A fuel filler neck 436 of the fuel tank 432 is conveniently located in essentially the same position as the charging plug 236 of the propulsion module 200 so as to also be easily accessible when the propulsion module 400 is connected to the driver module 100. A plenum 440 is mounted to the base plate 204 behind the fuel tank 432 and in front of the engine 428. The plenum 440 separate water, dust and dirt from the air and filters the air to be supplied to the engine 428. Air from the plenum 440 passes through a throttle body 444 that controls the flow of air to the engine 428 and then enters the engine 428. Exhaust gases from the engine 428 pass through an exhaust pipe 446, then through a muffler (not shown) disposed to the right of the right swing arm 218, and are then exhausted to the atmosphere. It is contemplated that the position of the above components on the base plate 204 could be different from what has been described.

The output shaft 448 of the engine 428 drives a sprocket 450. The sprocket 450 drive another sprocket (not shown) connected on an input shaft (not shown) of an automatic or semi-automatic transmission 452 via a belt 454. It is contemplated that other mechanisms could be used to drive the transmission 452 from the engine 428. The transmission 452 is mounted to the base plate 204 behind the engine 428 and laterally between the brackets 212. The transmission 452 drives the rear wheel 14 in a manner similar to the one used for driving the rear wheel 14 from the electric motor 228.

As should be appreciated, the above components of the propulsion module 400 are arranged on the base plate 204 in such a way that they can fit inside the channel 122 of the driver module 100.

A vehicle implemented in accordance with some non-limiting implementations of the present technology can be represented as follows in numbered clauses.

CLAUSE 1. A vehicle comprising: a driver module; and a propulsion module selectively connected to the driver module, the driver and propulsion modules being separable from each other as independent units. The driver module comprises: a driver module frame; at least one front wheel operatively connected to the driver module frame; at least one front suspension assembly operatively connecting the at least one front wheel to the driver module frame; and a seat connected to the frame. The propulsion module comprises: a propulsion module frame; at least one rear wheel operatively connected to the propulsion module frame; at least one rear suspension assembly operatively connecting the at least one rear wheel to the propulsion module frame; a motor operatively connected to the at least one rear wheel; and an energy storage device operatively connected to the motor.

CLAUSE 2. The vehicle of clause 1, wherein the driver module further comprises a steering assembly supported by the driver module frame and operatively connected to the at least one wheel.

CLAUSE 3. The vehicle of clause 1 or 2, wherein: the driver module frame defines a channel; and at least a portion of the propulsion module is received in the channel when the propulsion module is connected to the driver module.

CLAUSE 4. The vehicle of clause 3, wherein: the channel is open at a bottom thereof; and at least the portion of the propulsion module closes the bottom of the channel when the propulsion module is connected to the driver module.

CLAUSE 5. The vehicle of clause 3 or 4, wherein the channel is disposed below the seat.

CLAUSE 6. The vehicle of any one of clauses 3 to 5, wherein the at least one front wheel is two front wheels; and wherein a width of the channel is smaller than a lateral distance between the two front wheels.

CLAUSE 7. The vehicle of any one of clauses 1 to 6, wherein the propulsion module is fastened to a bottom of the driver module to connect the propulsion module to the driver module.

CLAUSE 8. The vehicle of any one of clauses 1 to 7, wherein, when the propulsion module is connected to the driver module, at least one of the motor, the energy storage device and the at least one rear wheel is disposed below the seat.

CLAUSE 9. The vehicle of any one of clauses 1 to 8, wherein: the driver module further comprises at least one first connector; the propulsion module further comprises at least one second connector; and the at least one first connector being connected to the at least one second connector when the propulsion module is connected to the driver module for transmitting at least one of electrical power and electronic signals between the driver module and the propulsion module.

CLAUSE 10. The vehicle of clause 9, wherein: the motor is an electric motor; the energy storage device is at least one battery cell; and the at least one first connector and the at least one second connector are low voltage connectors.

CLAUSE 11. The vehicle of any one of clauses 1 to 9, wherein: the motor is an electric motor; and the energy storage device is at least one battery cell.

CLAUSE 12. The vehicle of clause 10 or 11, wherein: the at least one rear suspension assembly includes a swing arm pivotally connecting the at least one rear wheel to the frame; and the electric motor is connected to and movable with the swing arm.

CLAUSE 13. The vehicle of any one of clauses 10 to 12, wherein the propulsion module further comprises: a charging control unit electrically connected to the at least one battery cell; and a charging plug electrically connected to the charging control unit, the charging plug permitting connection to an external electrical power source.

CLAUSE 14. The vehicle of any one of clauses 10 to 13, wherein the driver module further comprises: a speed control operator to be operated by a driver of the vehicle; and wherein the propulsion module further comprises: a motor control unit electrically connected to the electric motor, the motor control unit being electronically connected to the speed control operator.

CLAUSE 15. The vehicle of any one of clauses 10 to 14, wherein the propulsion module further comprises a diagnostic connector for connection to an external vehicle diagnostic tool, the diagnostic connector being electrically connected to at least one of the electric motor and the at least one battery cell.

CLAUSE 16. The vehicle of any one of clauses 10 to 15, wherein the electric motor is disposed longitudinally between the at least one battery cell and the at least one rear wheel.

CLAUSE 17. The vehicle of any one of clauses 1 to 9, wherein: the motor is an internal combustion engine; and the energy storage device is a fuel tank.

CLAUSE 18. The vehicle of clause 17, wherein the propulsion module further comprises: a plenum fluidly connected to the engine; and a transmission operatively connecting the engine to the at least one rear wheel.

CLAUSE 19. The vehicle of clause 17 or 18, wherein the fuel tank has a removable fuel filler cap, the fuel filler cap being accessible through an aperture in the driver module when the driver module is connected to the propulsion module.

CLAUSE 20. The vehicle of any one of clauses 1 to 19, wherein the driver module further comprises a storage compartment.

CLAUSE 21. The vehicle of any one of clauses 1 to 5 and 7 to 20, wherein the at least one front wheel is two front wheels.

CLAUSE 22. The vehicle of any one of clauses 1 to 21, wherein the at least one rear wheel is a single rear wheel.

CLAUSE 23. The vehicle of any one of clauses 1 to 22, wherein the seat is a straddle seat.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
 a driver module; and
 a propulsion module selectively connected to the driver module, the driver and propulsion modules being separable from each other as independent units,
 the driver module comprising:
  a driver module frame defining a channel;
  at least one front wheel operatively connected to the driver module frame;
  at least one front suspension assembly operatively connecting the at least one front wheel to the driver module frame; and
  a seat connected to the driver module frame;
 the propulsion module comprising:
  a propulsion module frame;
  at least one rear wheel operatively connected to the propulsion module frame;
  at least one rear suspension assembly operatively connecting the at least one rear wheel to the propulsion module frame, the at least one rear suspension assembly being pivotally connected to the propulsion module frame;
  a motor operatively connected to the at least one rear wheel; and
  an energy storage device operatively connected to the motor and mounted to the propulsion module frame,
 at least a portion of the propulsion module, including the energy storage device, being received in the channel when the propulsion module is connected to the driver module.

2. The vehicle of claim 1, wherein the driver module further comprises a steering assembly supported by the driver module frame and operatively connected to the at least one wheel.

3. The vehicle of claim 1, wherein:
 the channel is open at a bottom thereof; and
 at least the portion of the propulsion module closes the bottom of the channel when the propulsion module is connected to the driver module.

4. The vehicle of claim 1, wherein the channel is disposed below the seat.

5. The vehicle of claim 1, wherein the at least one front wheel is two front wheels; and
 wherein a width of the channel is smaller than a lateral distance between the two front wheels.

6. The vehicle of claim 1, wherein the propulsion module is fastened to a bottom of the driver module to connect the propulsion module to the driver module.

7. The vehicle of claim 1, wherein, when the propulsion module is connected to the driver module, at least one of the motor, the energy storage device and the at least one rear wheel is disposed below the seat.

8. The vehicle of claim 1, wherein:
 the driver module further comprises at least one first connector;
 the propulsion module further comprises at least one second connector; and
 the at least one first connector being connected to the at least one second connector when the propulsion module is connected to the driver module for transmitting at least one of electrical power and electronic signals between the driver module and the propulsion module.

9. The vehicle of claim 8, wherein:
 the motor is an electric motor;
 the energy storage device is at least one battery cell; and
 the at least one first connector and the at least one second connector are low voltage connectors.

10. The vehicle of claim 1, wherein:
 the motor is an electric motor; and
 the energy storage device is at least one battery cell.

11. The vehicle of claim 9, wherein:
 the at least one rear suspension assembly includes a swing arm pivotally connecting the at least one rear wheel to the frame; and
 the electric motor is connected to and movable with the swing arm.

12. The vehicle of claim 9, wherein the propulsion module further comprises:
 a charging control unit electrically connected to the at least one battery cell; and
 a charging plug electrically connected to the charging control unit, the charging plug permitting connection to an external electrical power source.

13. The vehicle of claim 9, wherein the driver module further comprises:
 a speed control operator to be operated by a driver of the vehicle; and
 wherein the propulsion module further comprises:
  a motor control unit electrically connected to the electric motor, the motor control unit being electronically connected to the speed control operator.

14. The vehicle of claim 9, wherein the propulsion module further comprises a diagnostic connector for connection to an external vehicle diagnostic tool, the diagnostic connector being electrically connected to at least one of the electric motor and the at least one battery cell.

15. The vehicle of claim 9, wherein the electric motor is disposed longitudinally between the at least one battery cell and the at least one rear wheel.

16. The vehicle of claim 1, wherein:
 the motor is an internal combustion engine; and
 the energy storage device is a fuel tank.

17. The vehicle of claim 16, wherein the propulsion module further comprises:
 a plenum fluidly connected to the engine; and
 a transmission operatively connecting the engine to the at least one rear wheel.

18. The vehicle of claim 16, wherein the fuel tank has a removable fuel filler cap, the fuel filler cap being accessible through an aperture in the driver module when the driver module is connected to the propulsion module.

19. The vehicle of claim 1, wherein the driver module further comprises a storage compartment.

20. The vehicle of claim 1, wherein the at least one front wheel is two front wheels.

21. The vehicle of claim 1, wherein the at least one rear wheel is a single rear wheel.

22. The vehicle of claim 1, wherein the seat is a straddle seat.

* * * * *